(12) United States Patent
Vaverek

(10) Patent No.: US 10,919,554 B1
(45) Date of Patent: Feb. 16, 2021

(54) THREE-WHEEL CARGO CART WITH ADJUSTABLE HANDLE HEIGHT

(71) Applicant: Milton James Vaverek, San Marcos, TX (US)

(72) Inventor: Milton James Vaverek, San Marcos, TX (US)

(*) Notice: Subject to any disclaimer, the term of this patent is extended or adjusted under 35 U.S.C. 154(b) by 0 days.

(21) Appl. No.: 16/781,957

(22) Filed: Feb. 4, 2020

(51) Int. Cl.
| | |
|---|---|
| *B62B 3/12* | (2006.01) |
| *B62B 3/02* | (2006.01) |
| *B62B 3/08* | (2006.01) |
| *B62B 1/00* | (2006.01) |
| *B62B 1/20* | (2006.01) |
| *B62B 5/04* | (2006.01) |
| *B62B 1/18* | (2006.01) |

(52) U.S. Cl.
CPC ............ *B62B 3/12* (2013.01); *B62B 1/002* (2013.01); *B62B 1/186* (2013.01); *B62B 1/20* (2013.01); *B62B 3/02* (2013.01); *B62B 3/08* (2013.01); *B62B 5/0442* (2013.01); *B62B 2206/006* (2013.01); *B62B 2301/05* (2013.01)

(58) Field of Classification Search
CPC .... B62B 3/12; B62B 3/02; B62B 3/08; B62B 1/002; B62B 1/18; B62B 1/186; B62B 1/20; B62B 2206/006; B62B 2301/05; B62B 5/0442

USPC ................................................... 280/47.26
See application file for complete search history.

(56) References Cited

U.S. PATENT DOCUMENTS

| | | | | |
|---|---|---|---|---|
| 605,316 | A * | 6/1898 | Kneeland | B60B 33/06 280/43.24 |
| 7,547,026 | B2 * | 6/2009 | Morris | B62B 1/18 280/47.31 |
| 8,668,210 | B2 * | 3/2014 | Stevens | B62B 1/24 280/47.26 |
| 9,663,131 | B1 * | 5/2017 | Lunt | B62B 1/186 |

\* cited by examiner

*Primary Examiner* — John D Walters
(74) *Attorney, Agent, or Firm* — Rick B. Yeager

(57) ABSTRACT

A hand propelled three wheeled cart for transporting miscellaneous cargo. The basic cart has a single front wheel with two solid rear supports, such as a standard wheelbarrow. The two rear wheels are attached to a lever that is pivotally connected to the lever mounting support brackets. Lifting the handles pries the two rear wheels, into position, elevating the rear cart support legs off the ground. This cam action reduces the operators lifting effort and improves the lateral stability of the cart. Releasing the handles automatically anchors the cart.

21 Claims, 7 Drawing Sheets

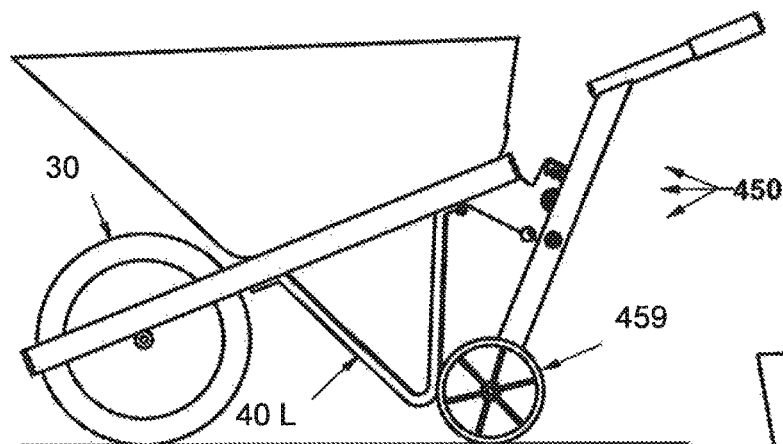
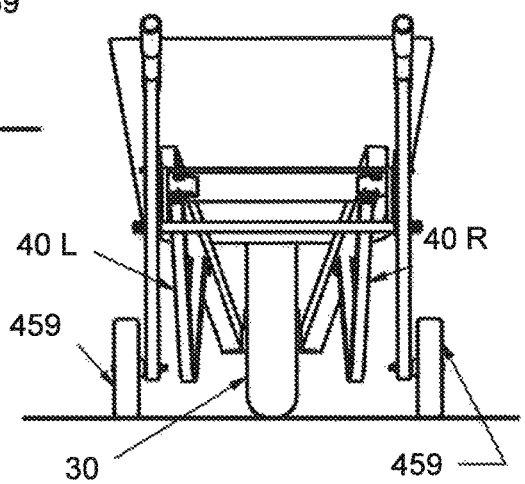
FIG 1A
FIG 1B
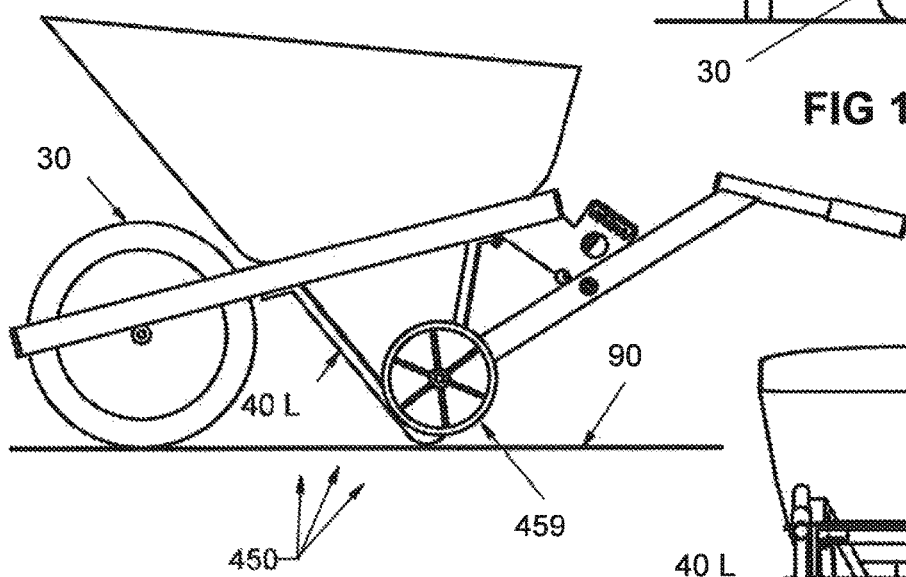
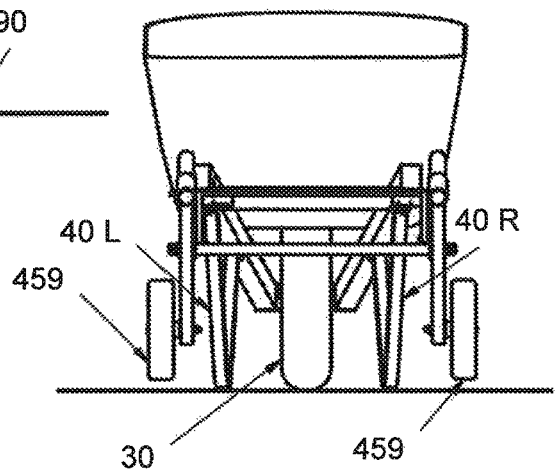
FIG 2A
FIG 2B

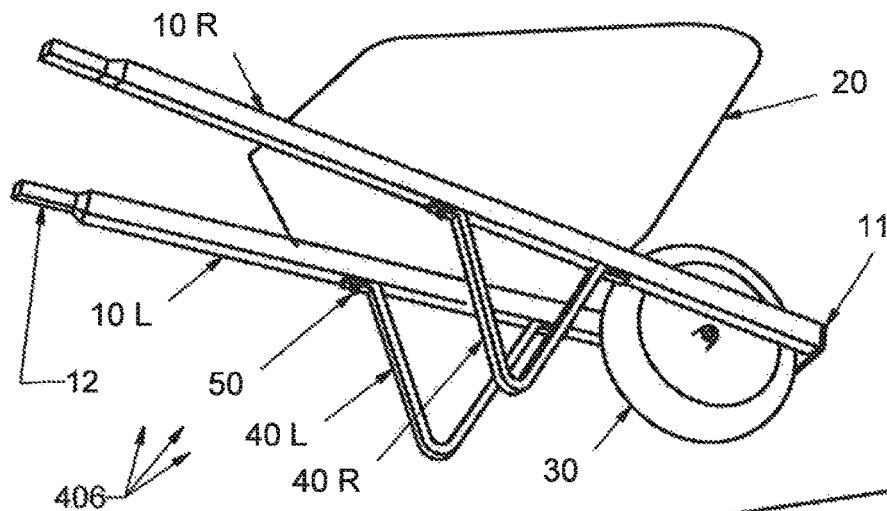
FIG 3A
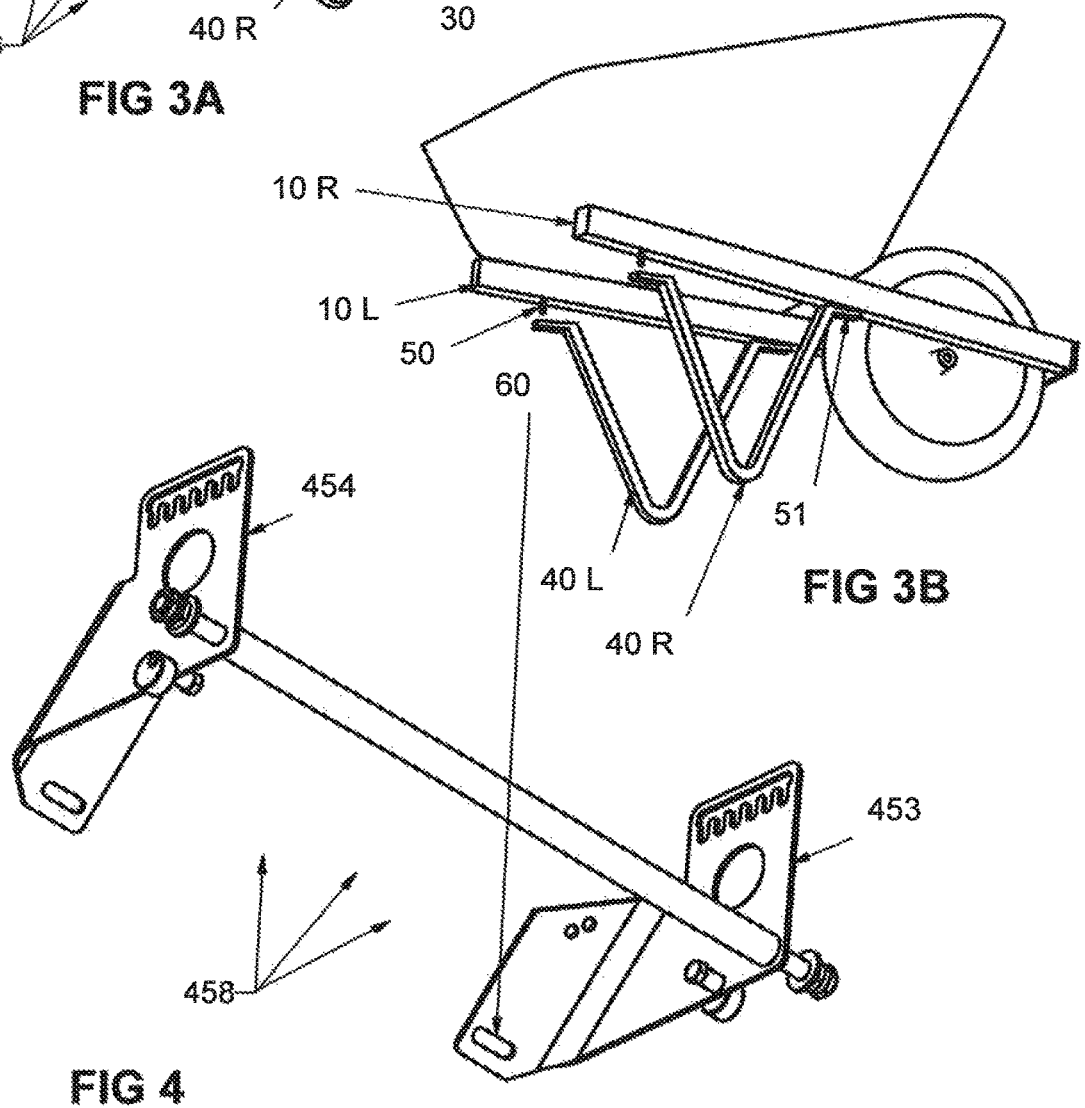
FIG 3B
FIG 4

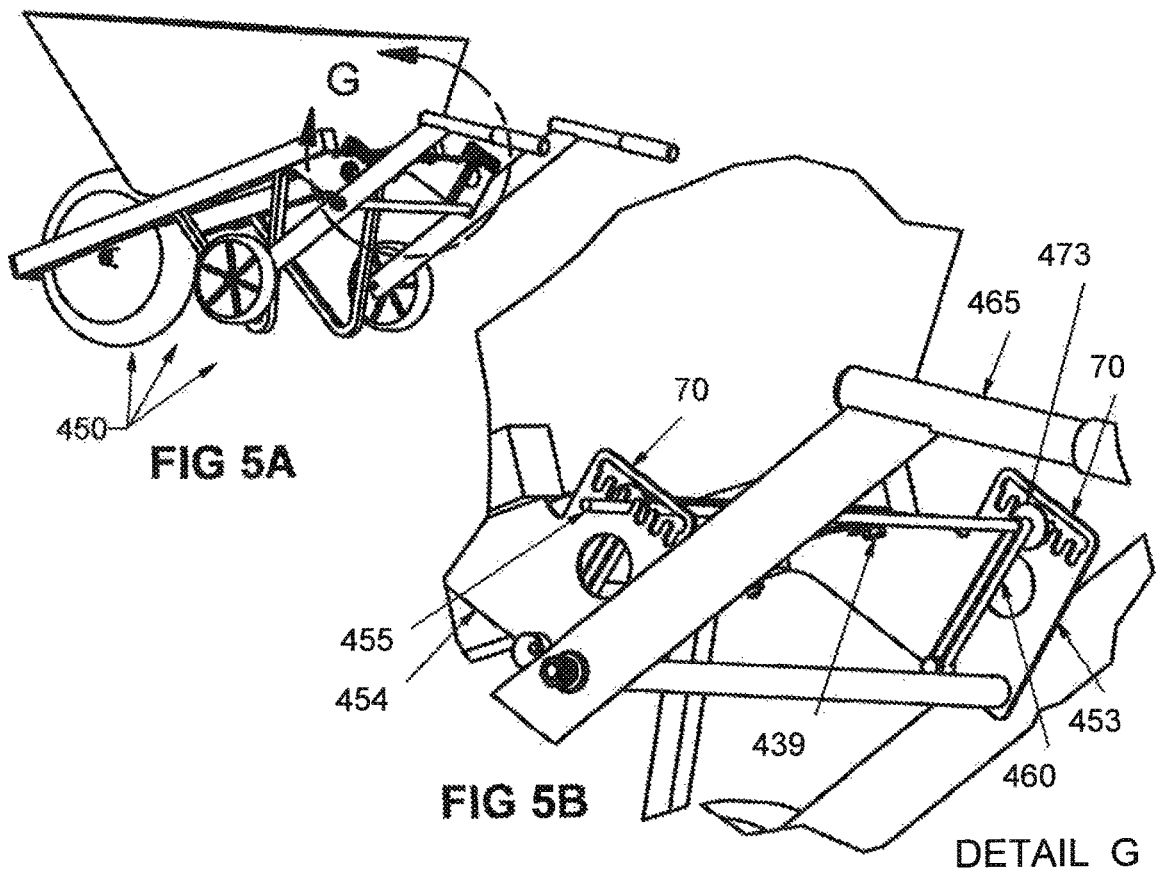
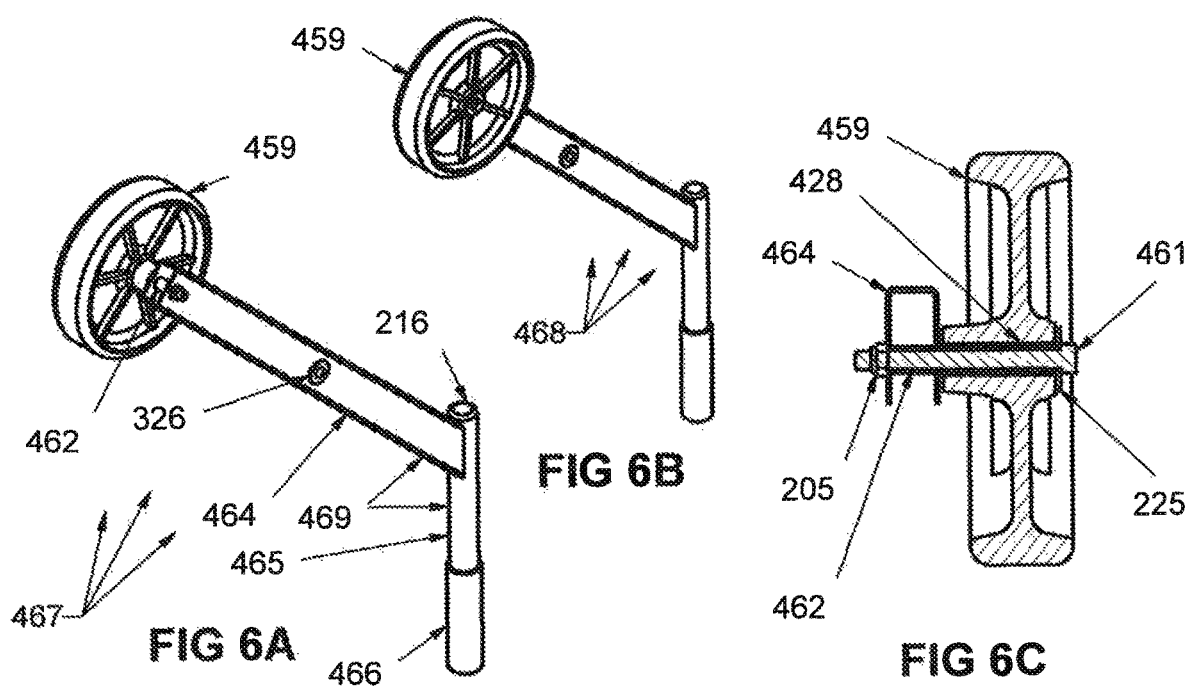

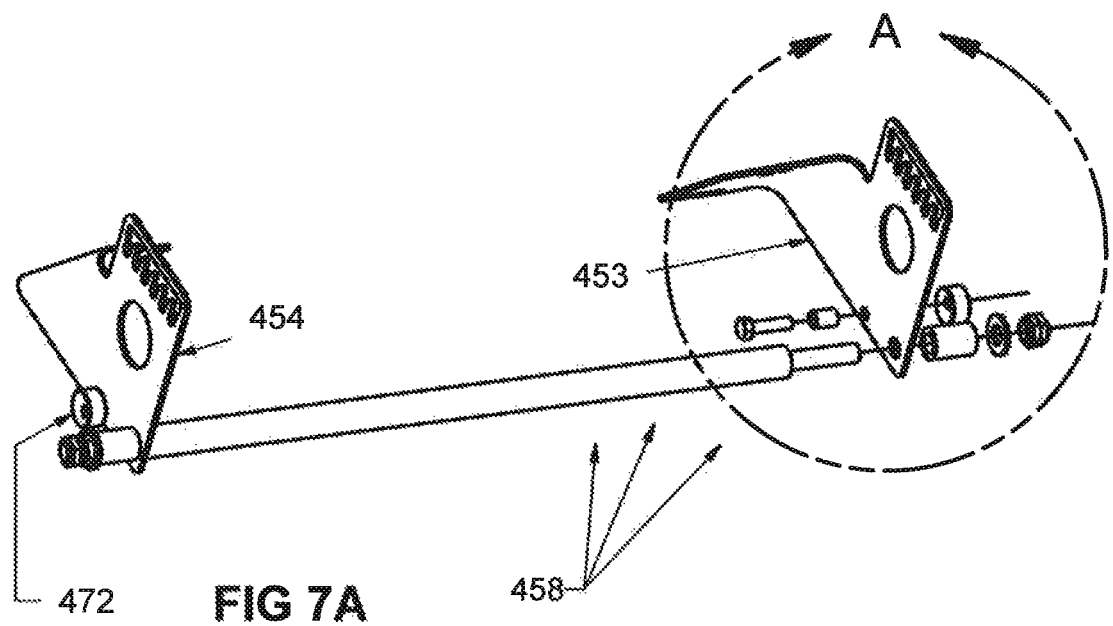
FIG 7A
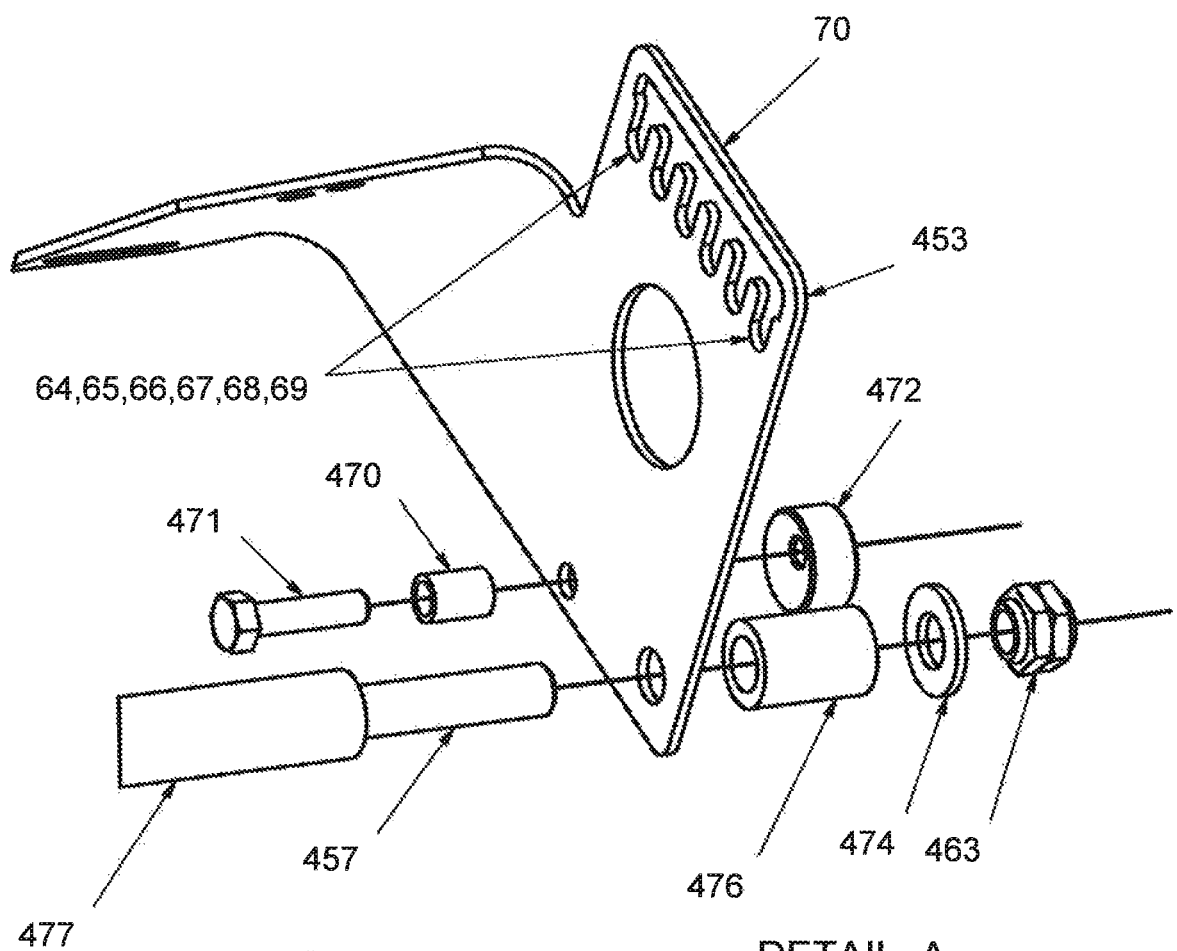
FIG 7B    DETAIL A

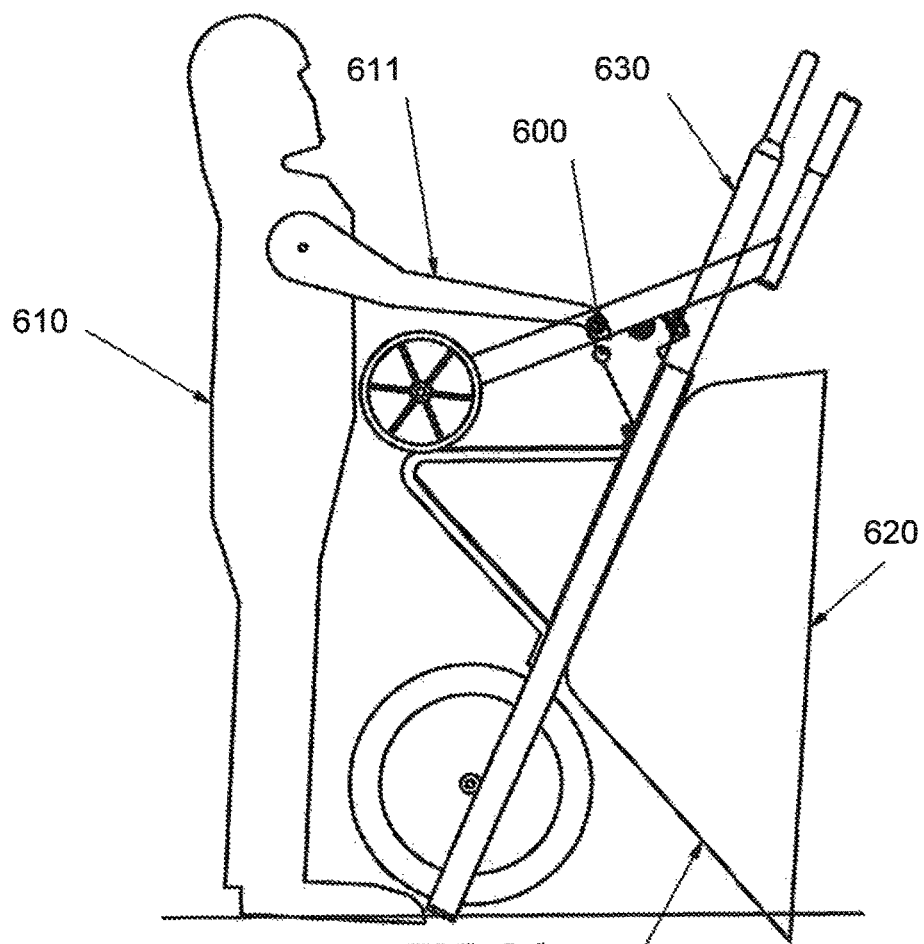
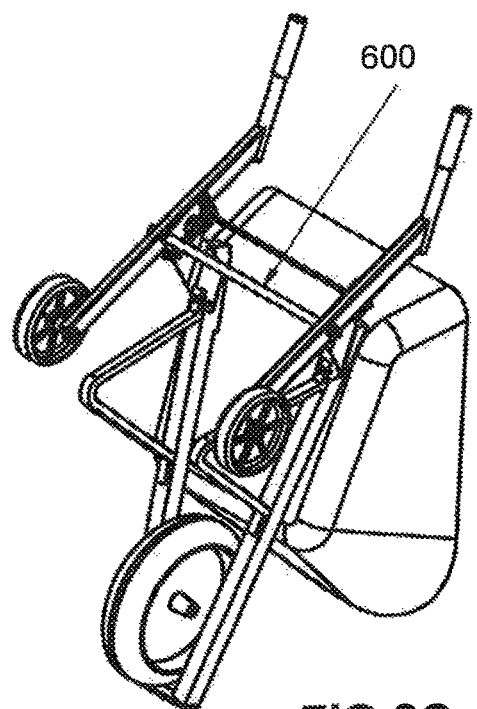
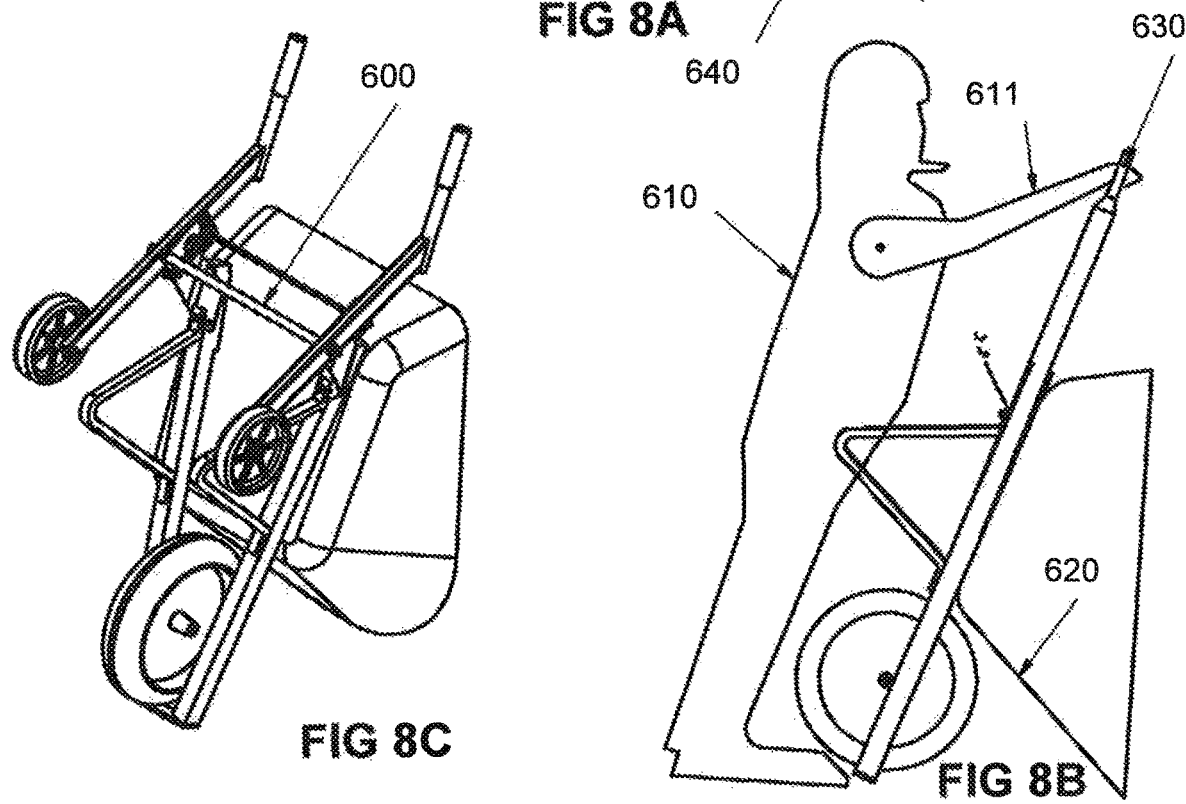
FIG 8A
FIG 8C
FIG 8B

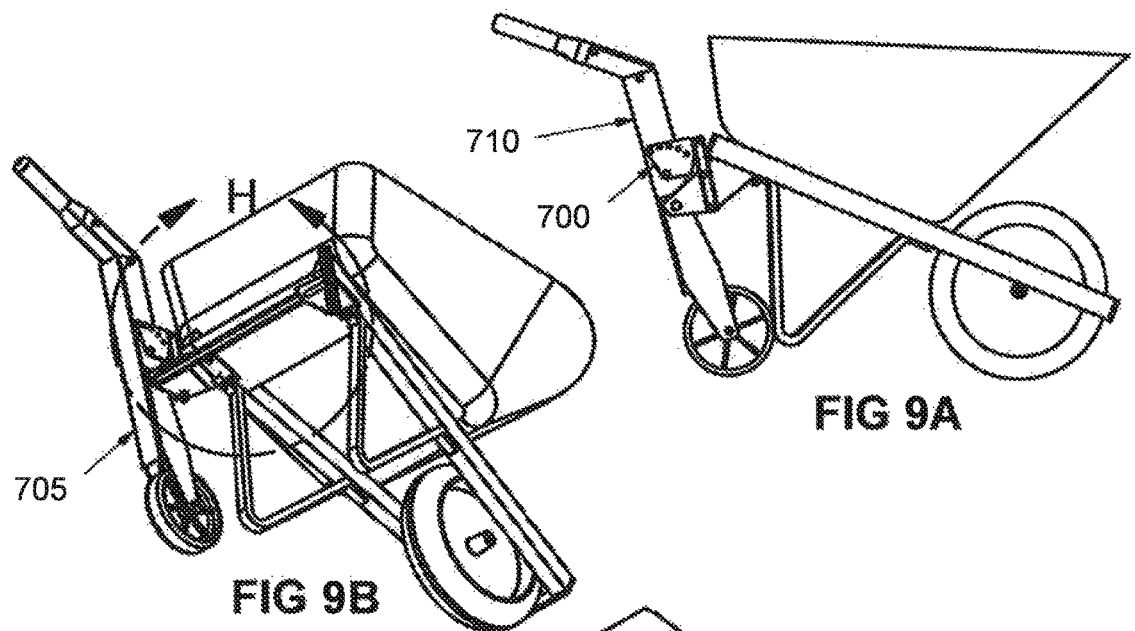
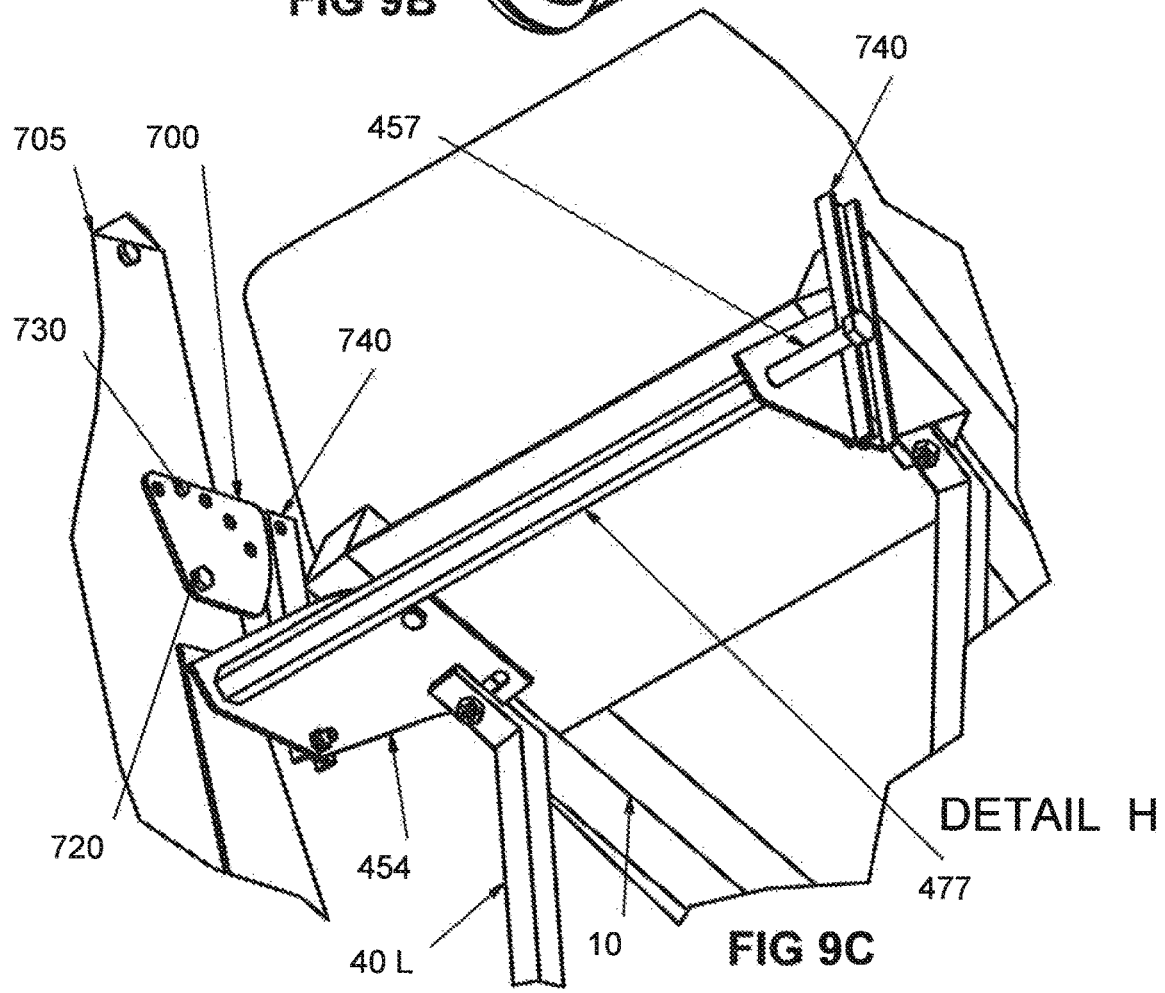

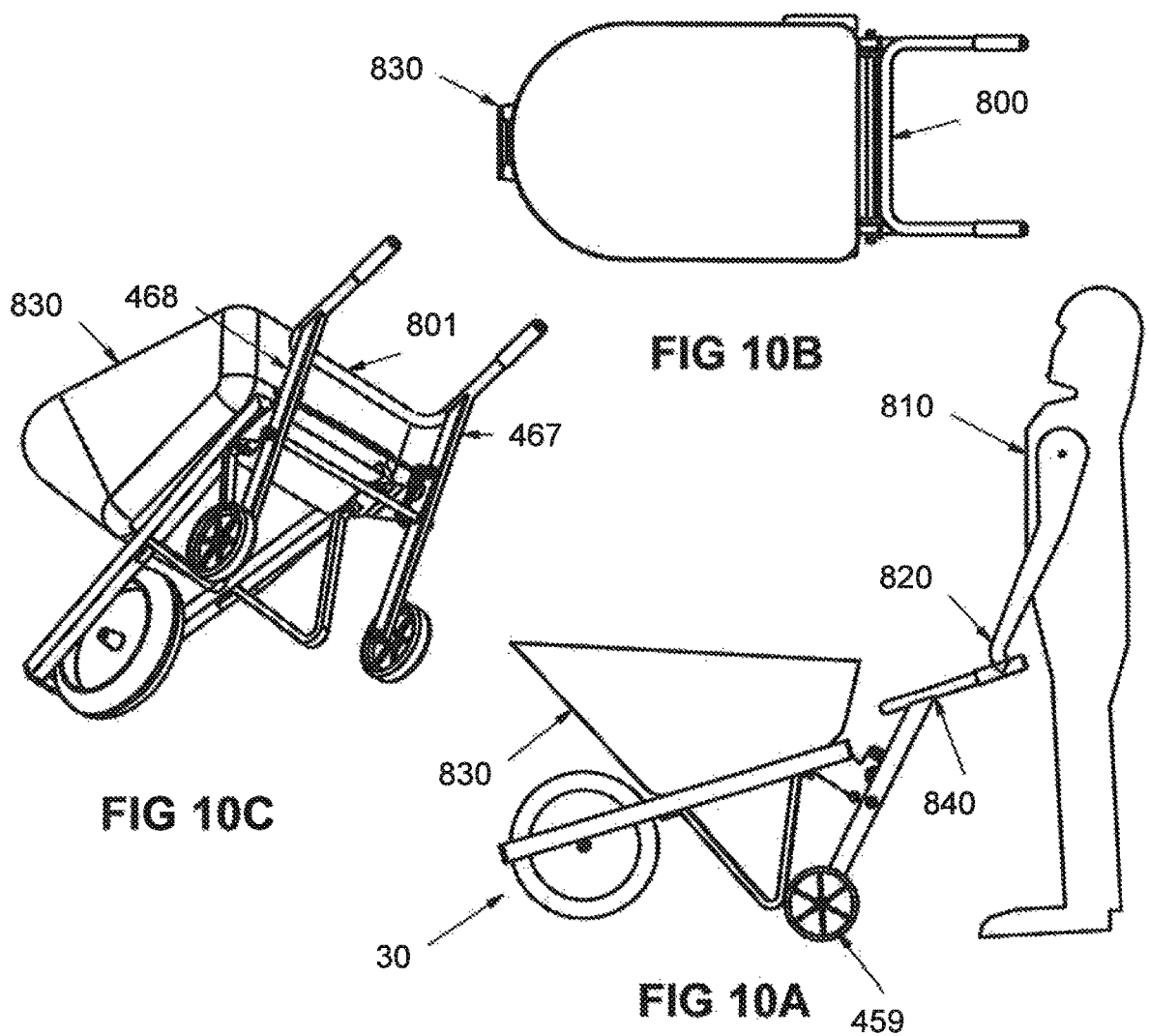
FIG 10B
FIG 10C
FIG 10A
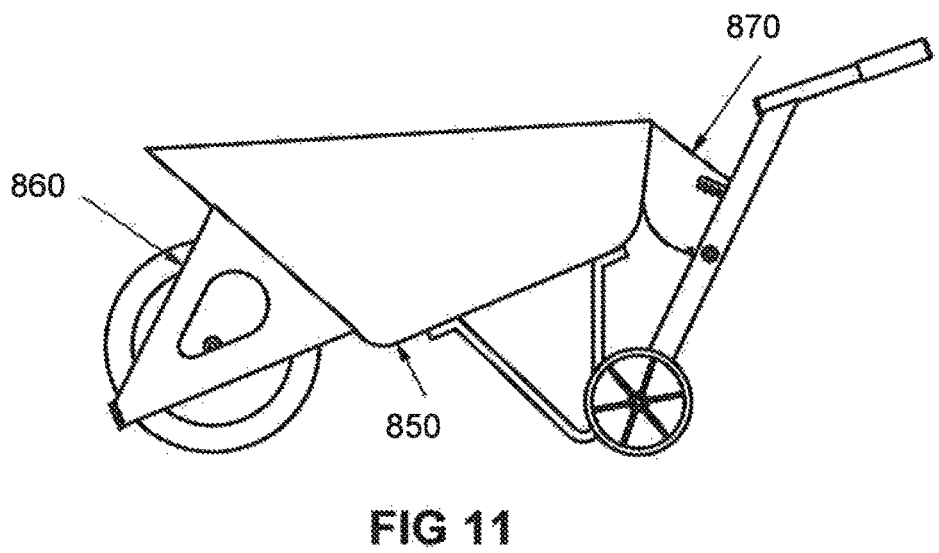
FIG 11

THREE-WHEEL CARGO CART WITH ADJUSTABLE HANDLE HEIGHT

RELATED APPLICATION

This non-provisional US patent application is related to Provisional Application No. 62/390,990 filed Apr. 18, 2016, by applicant, and claims the priority of that filing date.

BACKGROUND—FIELD OF INVENTION

The present invention relates to a cargo cart, and more particularly to a three-wheeled cart with adjustable handles height.

BACKGROUND—PRIOR ART1

The prior art includes various devices adapted to carry cargo.

U.S. Pat. No. 4,767,128 B1 to John J. Terhune for an improved wheelbarrow describes an adjustable handle height with telescoping tubes. This is awkward and time consuming as it requires removing and reinstalling handle adjustment retainer pins. In one embodiment of the current invention, the handle height adjustment is accomplished quickly by lifting the handle lever stop cross bar 455 FIG. SB and dropping it into the desired slot in brackets 453 and 454. Terhune provides a, mechanically complicated, automatic break feature when the handles are released. In one embodiment of the current invention, when adapted to a wheelbarrow, the automatic break feature is accomplished utilizing the existing rear cart support legs. Terhune requires removing and discarding the rear support legs 40 FIG. 3A.

U.S. Pat. No. 6,220,622 to Guadalupe Garcia for a New Wheelbarrow Rear Wheel System describes adjustable handle height by raising or lowering the rear of the wheelbarrow. This is accomplished using telescoping tubes and necessitates removing and reinstalling retainer pins.

In one embodiment of the current invention the handle height adjustment is accomplished quickly by lifting the handle lever stop cross bar 455 FIG. SB and dropping it in the desired slot in brackets 453 and 454. Garcia addresses the problem of anchoring the cart, when it is unattended, by setting a wheel clamping device that must be manually released.

U.S. Pat. No. 9,296,404 BI to Thomas L. Bell describes a conversion kit for adding two rear wheels to an existing Wheelbarrow. The handle height is not adjustable, but one additional handle is added above the standard handles. In one embodiment of the current invention the handles have six different height positions that can quickly be obtained by lifting the handle lever stop cross bar 455 FIG. SB and dropping it in the desired slot in brackets 453 and 454. Bell necessitates the removal and discarding of the existing cart rear support legs. One embodiment of the current invention utilizes the complete stand of a wheelbarrow, and only requires that the existing handles be cut off just aft of the existing rear support legs. Bell does not address the problem of anchoring the cart when it is unattended. The current invention utilizes the existing rear support legs as an automatic parking brake.

BACKGROUND

Most prior art wheelbarrows require the operator to bear about one-third of the payload weight while moving the unit on its only wheel. Many carts that provide three or four wheeled stability are unable to be used when a single plank needs to be navigated. Most do not have a parking brake feature and if they do it is not automatic and thus may not be applied when necessary. Many carts have a handle that is hinged at the front of the cart, such as a wagon, so it is comfortable for various height users to pull but it is award for the user to push the unit.

Advantages

Incorporating two wheels with articulated handles, to the rear of a standard wheelbarrow accomplishes three significant goals. The rear wheel assembly improves the lateral stability of the cart, supports most of the load normally born by the operator and provide an automatic brake feature.

SUMMARY

In one embodiment, a 3-wheel cart is provided that can be operated in either a standard wheelbarrow single wheel mode or in a 3-wheel mode. The complete cart can originate from a factory and possess the inventive features that are described below. Naturally the parts and assembly, on a factory assembly line, might vary considerably from the assembly steps listed below.

In one embodiment, a kit is provided that can convert a single tire wheelbarrow into a three wheeled unit. The kit is lightweight and easy to install on almost all existing wheelbarrows. The kit reduces the operators lifting effort, increases the unit's stability and provides an automatic parking brake. In one example, the additional two wheels never lock in the down load-carrying position.

In another embodiment, a 3-wheel cart is manufactured incorporating the features of the conversion kit. By eliminating the rigid long handles, typically used in a standard wheelbarrow, there is an opportunity to lower the cargo tub during transport, thereby improving the carts stability. Lowering the cargo center of gravity, on a typical wheelbarrow, has previously been impractical due to the necessary of dumping the cargo over the front wheel. When dumping, over the front wheel, the operator must extend his or her hands up and as far forward as possible which is a very awkward maneuver. Moving the single, or dual, front wheel(s) forward and upward to lower the tub, on a standard wheelbarrow, makes this dumping maneuver ever more difficult. The lever pivotal axis shaft, of this invention, becomes a convenient handle, to easily control the wheelbarrow, during a typical dumping operation. The advantages of all the inventor's kit features, described herein, can easily be incorporated in a factory assembled cart.

When negotiating a single plank, or turning, the operator lifts the rear two wheels off the ground to obtain normal wheelbarrow maneuverability. Three wheeled operation greatly reduces the effort of the operator when transporting cargo in both the forward and rearward direction.

In one embodiment, a 3-wheel cart is provided that offers the ability to control the cart attitude by maneuvering the left and right handles independently. This feature provides leveling capability of the tub while traversing a sloped surface with fluid cargo.

In one embodiment of the current invention a 3-wheel cart is provided that offers the handle height adjustment without the two additional wheel support levers functioning independently.

BRIEF DESCRIPTION OF THE DRAWINGS

FIGS. 1A-8C show a first embodiment of a conversion kit installed on a prior art wheelbarrow.

FIG. 1A is a side view of a first embodiment conversion kit installed on a wheelbarrow, with the wheelbarrow tub raised in the three wheel transport orientation.

FIG. 1B is a rear view of cart of FIG. 1A

FIG. 2A is a view of cart of FIG. 1A with the handles lowered and the rear support member resting on the ground and anchoring the cart.

FIG. 2B is a rear view of cart of FIG. 2A

FIG. 3A (PRIOR ART) is a view of an example a standard wheelbarrow.

FIG. 3B is a side perspective view of the wheelbarrow of FIG. 3A with the handles cutoff in preparation of installation of the additional wheels.

FIG. 4 is a perspective view of pivot mounting brackets and a pivot bar assembly.

FIG. 5A is a left rear perspective of the cart with the additional wheels in the cart parked position.

FIG. 5B is an enlarged view of the handle height adjustment mechanism shown in FIG. SA FIG. 6A is a perspective view of the right hand lever and wheel assembly.

FIG. 6B is the perspective view of the left hand lever and wheel assembly

FIG. 6C is a cross sectional view of a wheel to lever attachment.

FIG. 7A is an exploded view of the pivot mounting brackets and a pivot bar assembly of FIG. 4.

FIG. 7B is an exploded view of an end portion of the pivot mounting brackets and a pivot bar assembly of FIG. 4.

FIG. 8A is a side illustration of a cart, in its dumping attitude, with an operator standing erect and controlling the cart using the pivot bar of FIG. 4.

FIG. 8B is a side elevation of a standard cart, with ridged handles, illustrating the awkward stance required of the operator during the cart dumping maneuver.

FIG. 8C is a bottom perspective view of FIG. 8A illustrating the lever pivot bar 600 which is used during the tub dumping operation.

FIG. 9A is a side elevation of an alternate embodiment of a cart having a handle height adjustment cam that is mounted as part of the lever assemblies.

FIG. 9B is a lower right perspective view of the cart of FIG. 9A The right hand lever and wheel assembly have been removed to facilitate an improved view of the cam arrangement.

FIG. 9C is an enlarged partial view of FIG. 9B

FIG. 10A is a side elevation illustrating the cart with adjustable handles and an operator standing erect.

FIG. 10B is a lower left perspective of FIG. 10A illustrating a a crossmember that locks the left hand and right hand lever assemblies together.

FIG. 10C is a lower-left perspective of FIG. 10A illustrating a crossmember that locks the left hand and right hand lever assemblies together.

FIG. 11 is a side view of an embodiment of a cart that may be mass produced.

DESCRIPTION OF EMBODIMENT—3 WHEEL CART WITH ADJUSTABLE HANDLE HEIGHT

The following list of elements is provided for reviewing FIGS. 1-11

60 wheelbarrow
  10R, 10L handles
    11 distal ends
    12 proximal ends of cuthandles -continued 20 tub
  30 front wheel(s)
  40R, 40L rear supports
    50 rear anchor bolts
    51 front anchor bolts
90 ground
450 Complete 3 wheeled WheelbarrowAssembly
  406 Standard wheelbarrow modified by cutting offhandles
  458 Shaft and Pivot bracket sub-assembly
    457 crossmember shaft-Lever pivot
    474 Washer-SAE½" Flat
      453 Bracket-RH. Pivot
      60 rear anchor bolt slot
      65, 66, 67, 68, 69 adjustment notches
      70 notch bar feature
        473 Washer-5/16 Fender
      460 Band - Elastic Tension
    454 Bracket-L.H. Pivot
      60 rear anchor bolt slot
      65, 66, 67, 68, 69 adjustment notches
  470 Spacer-(SPCR .250 × .625 FK SP 150)
  471 Bolt-SHCS ¼-20 × 1-½LG
  472 Nut-¼-20 Coupling
  476 Spacer Temporary
  463 Nut-½-13 Jam
  477 Tube-Bracket Spacer
467 Lever & Wheel Sub-assembly-R.H.
  469 Lever-Weldment sub-assembly
    464 Lever Rectangular Base
    465 Lever Tube Handle
    462 Rectangular tube Reinforcement
  225 Washer-⅜ flat
  461 Bolt ⅜-16 × 3-¾Axle
  205 Nut-⅜-16 jam lock
  459 Wheel-8" offset hub
  326 Bushing-Nylon flanged
  462 Spacer-Rect. Tube (SO. D-428)
  428 Bushing-Axle
  216 Plug handle
    466 Grip-Handle
468 Lever & Wheel Sub-assembly L.H.
  469 Lever-Weldment sub-assembly
    464 Lever Rectangular Base
    465 Lever Tube Handle
    462 Rectangular tube Reinforcement (S.O.D-428)
  461 Bolt ⅜-16 × 3-¾Axle
  205 Lock Nut-⅜-16 jam lock
  459 Wheel-8" offset hub
  326 Pivot Bushing-Nylon flanged
  462 Spacer-Rect. Tube (S.O.D-428)
  428 Wheel Bushing-Axle
  216 Plug handle
  466 Grip-Handle
455 Stop cross bar
  70 notch bar feature
    473 Washer- 5/16 Fender
  460 Band- Elastic Tension
  439 Lag Screw 5/16 × 1-¼" Hex Hd. (2×)
610 Operator
  611 operator arm
600 lever pivot bar
630 rigid handles
705 lever assemblies
700 handle height adjustment cam
710 lever
720 pivot bolt
730 spring loaded pin
740 travel stop
channel
830 cart
  840 adjustable handles
  810 operator
  820 hands
850 cargo tub
  860 front wheel support
  870 rear lever pivot brackets

Definitions

In this specification, the term "standard wheelbarrow" refers to any currently available wheelbarrow with long frame members connecting the front wheel or wheels at the distal end to the handle grips at the proximal end with the cargo tub mounted above the frame members. In this specification, the term "elastic band" refers to any elastic element, or other retention feature that serves to hold an end of the stop cross bar 455 in a desired orientation, and permits the stop cross bar to be moved to another orientation. In the example shown, two elastic bands serve this function.

In this specification, the term "handle height adjustment mechanism" refers generally to any mechanisms that permit the user to lower the handles in order to rest the load on rear supports, or raise the handles in order to support a portion of the load on both rear wheels.

DETAILED DESCRIPTION

FIG. IA is a left side view of an embodiment of a three wheeled complete cart assembly 450 with the front wheel 30 and rear wheels supporting the unit and the solid rear support member 40 above the ground surface 90. FIG. IB is a rear view of cart of —FIG. IA FIG. 2Ats a left side view of three wheeled cart assembly 450 of FIG. IA with the handles 30R and 30L lowered, and the rear support members 40R and 40L resting on the ground 90 and anchoring the cart. FIG. 2B is a rear view of cart of FIG. 2A.

FIG. 3A(Prior Art) is a lower right view of an embodiment of an existing standard wheelbarrow 406. The distal ends 11 of the rigid support handles lOR and lOL anchor the front wheel 30, or wheels, and the proximal ends 12 of the cut handles are used to operate the cart. The main support handles 10A and 10B connect the tub 20 to the front wheel(s) 30 and the rear support legs 40L and 40R.

FIG. 3B is a view of FIG. 3A with the handles lOA and lOB cut off in preparation of installing the lever pivot bracket assembly 458. This view also illustrates the tub rear anchor bolts 50 disconnected and the forward two anchor bolts 51 loosened to allow the rear support leg 40 to articulate so as to provide entry of the pivot brackets 453 and 454.

FIG. 4 is a perspective view of the pivot bracket assembly 458. The procedure for assembly of pivot bracket assembly 458 is illustrated at FIG. 7A Once the brackets are inserted between the handles lOR and lOL and the rear supports 40R and 40L, the anchor bolt 50 is inserted through slot 60 of both pivot brackets 453 and 454. The rear support legs 40 are then reconnected securely clamping the pivot brackets 453 and 454 between the cart support members lOR and lOL and the cart rear support legs 40. The prior art, when adding additional wheels, either removes the support legs 40 or utilizes them to mount the additional wheels which are not capable of being retracted.

FIG. 5A is a lower perspective view of the completely assembled 3 wheeled cart 450.

FIG. 5B is an enlarged perspective view of a proportion of FIG. 5A. A stop cross bar 455 is positioned in selected notches of the lever pivot support brackets 453 and 454. In this example, the stop cross bar 455 is retained in the selected notch by two stretchable bands 460. Flat washer 473 protects the bands from harm as stop cross bar 455 is adjusted. In this example, the pivot brackets 453 and 454 each have a bar feature 70 above the notches 65, 66, 67, 68, and 69 so the operator cannot over-extend the stretchable bands 460.

To adjust the height of handle 465, the stop cross bar 455 is moved from one notch to another controlling the vertical travel of the handle 468 as may be required by various height operators. In this example, the right and left levers may be positioned independently by selecting different adjustment notches on the right and left side. In other examples, as discussed below, the right and left levers are connected by a rigid crossmember so that height adjustment is the same on both levers.

Leg bolts 439, for wood handled carts, (or hex head bolts and nuts if the handles are steel tubing) are required to completely secure the pivot brackets 453, 454 to the cart handles.

FIG. 6A is a perspective view of the right lever-handle and wheel assembly 468. The lever weldment subassembly 469 comprises a rectangular tube base 464 and a round handle tube 465. Two pivot bushings 326 provide the axis for pivoting the lever assembly 468. Handle grips 466 are on the proximal end of the lever and wheel 459 is at the distal end of the lever. A plug 216 is provided in the lever tube handle 465.

FIG. 6B is a perspective view of the left hand lever-handle and wheel assembly 467. The component parts are identical to the right hand lever 468 except the wheel 459 is mounted on the opposite side of the lever weldment 469.

FIG. 6C is common in both lever assemblies 467 and 468. FIG. 6C is a cross section view of the assembly of the wheel 459 and the axle bolt 461, wheel bushing 428, flat washer 225 and a lock nut 205 to the lever rectangular tube 464.

FIG. 7A is an exploded perspective view of the pivot bracket assembly 458, pivot brackets and lever stop cam assembly 458. The handle height control notches 64 thru 69 as well as the retainer bar 70 are illustrated. See FIGS. 7B and 7C for detailed description of the components and their assembly procedure.

FIG. 7B is an enlarged view of the exploded end of the sub-assembly 458 shown in FIG. 7A Careful construction of this assembly 458 is necessary to correctly space the mounting brackets 453 and 454. The first step is to slide the main spacer tube 477 on the 457 shaft. Next, the left hand bracket 454 and right hand bracket 453 are installed on each end of the crossmember shaft 457 with their flanges angled toward each other. Next, the temporary spacer tubes 476 are slid onto each end of the shaft 457. Then, the flat washers 474 and retainer nuts 463 are assembled at each end of the crossmember shaft 457. This clamps the anchor brackets 453 and 454 securely in place, spaced apart the proper distance, for installation on the cart 406. Next, the spacer tube 470, that anchors the stretchable band 460, see FIG. SB is held in place by bolt 471 and the lever handle, downward travel, adjustment cam 472. The cam 472 restricts the downward travel of the lever and handles 467 and 468 when they are released by the operator and the cart is parked. The cam stop feature, for operator convince, keeps the handles as high up as possible when the cart is parked.

After the pivot bracket assembly 458, see FIG. 4, has been clamped in place, see FIG. 3A, the temporary spacer tubes 478 are discarded and replaced with the lever assemblies 467 and 468 see FIGS. 6 and 6A. The flat washers 474 and nuts 463, which had retained the discarded spacer tubes 478, are reassembled to secure the lever assemblies 467 and 468.

Next, with the cart parked on a flat surface, articulate the levers 467 and 468 so the wheels 459 are about 0.25 inches above the surface. Rotate the lever stop cams 472 until they touch the levers 467 and 468. Secure both cams 472, in this position, by tightening their anchor bolts 471. FIG. 8A is a side elevation of a standard wheelbarrow 620, with rigid handles 630, shown dumping the cargo over the front wheel. By gripping the lever pivot axle (bar) 600, the operator 610 can easily control the cart while standing erect with arms 611 extended forward in a comfortable position.

FIG. 8A is a side elevation of a standard wheelbarrow 620 with rigid handles 630 shown dumping the cargo over the front wheel. By gripping the lever pivot axle (bar) 600, the operator 610 can easily control the cart while standing erect with arms 611 extended forward in a comfortable position. For operator convenience the cam stop feature keeps the handles as high up as possible when the cart is parked.

FIG. 8B is a side elevation of a standard cart 620 illustrating the awkward stance required of the operator 610 during the dumping operation. The operator is required to lean forward with his or her arms 611 elevated to reach the cart's standard ridged handles 630.

FIG. 8C is a bottom perspective view of the cart of FIG. 8A illustrating the lever pivot bar 600 which is used as a convenient handle for controlling the tub 620 during the dumping operation.

FIG. 9A is a side elevation of an alternate embodiment of a cart having a handle height adjustment cam 700 that is mounted as part of the lever assemblies 705.

FIG. 9B is a lower right perspective of FIG. 9A. The right hand lever and wheel assembly have been removed to facilitate an improved view of the cam configuration in the left lever assembly 705.

FIG. 9C is an enlarged partial view of FIG. 9B illustrating the cam function. The cam 700 is attached to the lever 710 by a pivot bolt 720. The handle height adjustment is accomplished rotating the cam and locking it in place using a spring loaded pin 730. The cam 700 contacts the travel stop channel 740 and controls the upward movement of the handles. The downward handle travel is controlled when the lever strikes the lower portion of the stop channel 740.

FIG. 10A is a side elevation illustrating a cart 830 with adjustable handles 840 and an operator 810 standing erect with hands 820 comfortably contacting the handles 840. The two levers supporting the wheels 459 are fastened together so they must articulate together. In some applications, it may be desirable to operate the levers together rather than independently.

FIG. 10B is a top view of FIG. 10A illustrating a method of securing the left hand 467 and right hand 468 lever assemblies so they cannot articulate independently. The handle tube 800 is formed in a U shape, similar to the handle bars on a bicycle.

FIG. 10C is a lower-left perspective of FIG. 10A illustrating a crossmember 801 that locks the left hand 468 and right hand 467 lever assemblies together. This crossmember 801 is only one of many ways the levers can be modified to function together.

DESCRIPTION OF EMBODIMENT—3 WHEEL CART CONVERSION KIT

In this embodiment, a conversion kit is provided in order to modify an existing wheelbarrow. In one example, the conversion kit comprises the Shaft and Pivot bracket sub-assembly 458, the Lever & Wheel Sub-assembly-RH. 467, and the Lever & Wheel Sub-assembly L.H. 468.

DESCRIPTION OF EMBODIMENT—3 WHEEL CART WITH INTEGRAL TUB FEATURES

In this embodiment, a 3 wheel cart may be provided by integrating several of the conversion kit features into the tub such as described in the example of FIG. 11.

FIG. 11 is a side elevation of an embodiment of a cart that may be mass produced with the height of the cargo tub 850 lowered to facilitate a more stable lower center of gravity. This design flexibility is possible by eliminating the need to have rigid long beams, of a standard wheelbarrow, connecting the handles to the cart wheel. The front wheel support 860 can be incorporated as part of the tub 850. The features of the rear lever pivot brackets 870, as revealed in this patent application, can also be incorporated as an integral part of the tub 850 body.

Manufacturing a complete cart assembly, in a factory environment, offers additional possibilities. In addition to the features noted in FIG. 11, it would be an asset to include load sensing capability. The sensors would monitor loads on the two rear wheels. If an operator was pushing a heavy offset load that would be a tip-over problem when he or she attempted one wheel operation, there could be an audible signal alerting the potential tip-over danger. The operator could also be advised, ahead of time, that a load was too heavy to maneuver on one wheel without putting the operator in danger.

Method of Conversion

In one embodiment of the current invention, when applying the kit, the only modification required to an existing wheelbarrow is to cut off the handles 4 or 5 inches aft of the wheelbarrow's rear support legs. The kit mounting brackets are easily and accurately located by retaining them using the existing rear leg and tub mounting bolts, 50 FIG. 3B.

The kit is made up of two lever assemblies, left hand and right hand support brackets and a crossmember shaft that serves as an axle on which the levers pivot. The lever assemblies consist of a wheel at the distal end and rubber handle grips at the proximal end. In the center there is a bushed hole that is the pivot axis of the levers.

The lever pivot support brackets are clamped between the underside of the existing wheelbarrow handles and the existing rear solid tub support legs. The brackets are both located and secured utilizing the existing tub and support leg rear anchor bolts. After the overall alignment is verified two additional bolts 439 FIG. SB, are added to secure the lever pivot support brackets.

It is to be understood that the specific embodiments and examples described above are by way of illustration, and not limitation. Various modifications may be made by one of ordinary skill, and the scope of the invention is as defined in the appended claims.

What is claimed is:

1. A three-wheeled cargo cart
comprising a tub;
a right side tub rear support; a
left side tub rear support;
a first front wheel configured to rotate on a first front wheel axle;
a right side tub lifting handle having a proximal end, and a distal end supported by the first front wheel axle;
a left side tub lifting handle having a proximal end, and a distal end supported by the first front wheel axle;
a right side lever and wheel assembly comprising
a lever having a proximal end and a distal end and a pivot point provided between the proximal end and the distal end, a lever handle provided on the proximal end of the lever, and a right side rear wheel configured to rotate in proximity to the distal end of the lever;

a left side lever and wheel assembly comprising a lever having a proximal end and a distal end and a pivot point provided between the proximal end and the distal end, a lever handle provided on the proximal end of the lever, and a left side rear wheel configured to rotate in proximity to the distal end of the lever;

a right hand pivot bracket attached to the tub or attached to the right lifting handle in proximity to the proximal end of the right lifting handle, the right hand pivot bracket comprising a plurality of adjustment notches, and a right lever stop cam;

a left hand pivot bracket attached to the tub or attached to the right lifting handle in proximity to the proximal end of the right lifting handle, the right hand pivot bracket comprising a plurality of adjustment notches, and a left lever stop cam; and a crossmember shaft comprising a right end portion pivotally attached to the right side lever pivot point and to the right hand pivot bracket thereby permitting the right side lever to pivot relative to the right hand pivot bracket, so that as the right side handle is raised, the right rear wheel is lowered, and as the right side handle is lowered, the right rear wheel is raised, and a left end portion pivotally attached to the left side lever pivot point and to the left hand pivot bracket thereby permitting the left side lever to pivot relative to the left hand pivot bracket, so that as the left side handle is raised, the left rear wheel is lowered, and as the left side handle is lowered, the left rear wheel is raised.

2. The three-wheeled cargo cart of claim 1 further comprising a stop cross bar comprising a right end insertable into a selected adjustment notch of the plurality of adjustment notches in the right hand pivot bracket, and a left end insertable into a selected adjustment notch of the plurality of adjustment notches in the left hand pivot bracket.

3. The three-wheeled cargo cart of claim 1 further comprising a right side tensioning element and a left side tensioning element.

4. The three-wheeled cargo cart of claim 3 wherein the right hand pivot bracket further comprises a bolt or peg retention feature; and the right side tensioning element further comprises an elastic band looped over a right end portion of the stop cross bar and looped over the bolt or peg retention feature, such that the elastic band holds the right end portion of the stop cross bar in one of the plurality of adjustment notches.

5. The three-wheeled cargo cart of claim 3 wherein the right hand pivot bracket further comprises a bolt, peg, or slot retention feature; and the right side tensioning element further comprises a spring having a first end attached to a right end portion of the crossmember stop bar and a second end attached to the bolt, peg, or slot retention feature, such that the spring holds the right end portion of the crossmember stop bar in one of the plurality of adjustment notches, thereby securing the right side lever at a desired pivot position.

6. The three-wheeled cargo cart of claim 3 further comprising a rigid coupling extending between the right hand pivot bracket and the left hand pivot bracket.

7. The three-wheeled cargo cart of claim 1 further comprising a second front wheel.

8. The three-wheeled cargo cart of claim 1 wherein the right hand pivot bracket, the left hand pivot bracket, the right rear support, and the left rear support are integral to the tub.

9. The three-wheeled cargo cart of claim 1 further comprising a right rear wheel load sensor;

a left rear wheel load sensor; and an alarm activated by the right and left rear load sensor.

10. The wheelbarrow conversion kit of claim 1 wherein the right hand pivot bracket is attached to a right lifting handle which is cut off in proximity to the right rear support; and the left hand pivot bracket is attached to a left lifting handle which is cut off in proximity to the left rear support.

11. A method of adjusting a three-wheeled cargo cart to minimize the downward travel of the handles, the method comprising providing a three wheel cart comprising a tub;

a right side tub rear support; a left side tub rear support;

a first front wheel configured to rotate on a first front wheel axle;

a right side tub lifting handle having a proximal end, and a distal end supported by the first front wheel axle;

a left side tub lifting handle having a proximal end, and a distal end supported by the first front wheel axle;

a right side lever and wheel assembly comprising a lever having a proximal end and a distal end and a pivot point provided between the proximal end and the distal end, a lever handle provided on the proximal end of the lever, and a right side rear wheel configured to rotate in proximity to the distal end of the lever;

a left side lever and wheel assembly comprising a lever having a proximal end and a distal end and a pivot point provided between the proximal end and the distal end, a lever handle provided on the proximal end of the lever, and a left side rear wheel configured to rotate in proximity to the distal end of the lever;

a right hand pivot bracket attached to the tub or attached to the right lifting handle in proximity to the proximal end of the right lifting handle, the right hand pivot bracket comprising a plurality of adjustment notches, and a right lever stop cam;

a left hand pivot bracket attached to the tub or attached to the right lifting handle in proximity to the proximal end of the right lifting handle, the right hand pivot bracket comprising a plurality of adjustment notches, and a left lever stop cam; and a crossmember shaft comprising
a right end portion pivotally attached to the right side lever pivot point and to the right hand pivot bracket thereby permitting the right side lever to pivot relative to the right hand pivot bracket, so that as the right side handle is raised, the right rear wheel is lowered, and as the right side handle is lowered, the right rear wheel is raised, and
a left end portion pivotally attached to the left side lever pivot point and to the left hand pivot bracket thereby permitting the left side lever to pivot relative to the left hand pivot bracket, so that as the left side handle is raised, the left rear wheel is lowered, and as the left side handle is lowered, the left rear wheel is raised; and
a stop cross bar comprising
a right end insertable into a selected adjustment notch of the plurality of adjustment notches in the right hand pivot bracket, and
a left end insertable into a selected adjustment notch of the plurality of adjustment notches in the left hand pivot bracket; and
adjusting the right lever stop cam and the left lever stop cam by
with the cart parked on a flat surface, articulating the right lever and the left lever so that the right wheel and left wheel are resting on the surface,
rotating the right lever stop cam and the left lever stop cam until they touch the right lever and left lever, respectively, and
securing right lever stop cam and the left lever stop cam.

12. A wheelbarrow conversion kit, for converting a wheelbarrow comprising a tub, a frontwheel, a right and a left rear support, a right support arm, and a left support arm, the wheelbarrow conversion kit comprising
a right side lever and wheel assembly comprising
a lever having a proximal end and a distal end and a pivot point provided between the proximal end and the distal end,
a lever handle provided on the proximal end of the lever, and
a right side rear wheel configured to rotate in proximity to the distal end of the lever;
a left side lever and wheel assembly comprising
a lever having a proximal end and a distal end and a pivot point provided between the proximal end and the distal end,
a lever handle provided on the proximal end of the lever, and
a left side rear wheel configured to rotate in proximity to the distal end of the lever;
a right hand pivot bracket attached to the tub or attached to the right lifting handle in proximity to the proximal end of the right lifting handle, the right hand pivot bracket comprising
a plurality of adjustment notches, and
a right lever stop cam;
a left hand pivot bracket attached to the tub or attached to the right lifting handle in proximity to the proximal end of the right lifting handle, the right hand pivot bracket comprising
a plurality of adjustment notches, and a
left lever stop cam; and
a crossmember shaft comprising
a right end portion pivotally attached to the right side lever pivot point and to the right hand pivot bracket thereby permitting the right side lever to pivot relative to the right hand pivot bracket, so that as the right side handle is raised, the right rear wheel is lowered, and as the right side handle is lowered, the right rear wheel is raised, and
a left end portion pivotally attached to the left side lever pivot point and to the left hand pivot bracket thereby permitting the left side lever to pivot relative to the left hand pivot bracket, so that as the left side handle is raised, the left rear wheel is lowered, and as the left side handle is lowered, the left rear wheel is raised.

13. The wheelbarrow conversion kit of claim 12 further comprising a stop cross bar comprising
a right end insert-able into a selected adjustment notch of the plurality of adjustment notches in the right hand pivot bracket, and
a left end insert-able into a selected adjustment notch of the plurality of adjustment notches in the left hand pivot bracket.

14. The wheelbarrow conversion kit of claim 12 further comprises a right side spring or elastic band tensioning element and a left side spring or elastic band tensioning element.

15. The wheelbarrow conversion kit of claim 12 further comprising
a rigid coupling extending between the right hand pivot bracket and the left hand pivot bracket.

16. The wheelbarrow conversion kit of claim 12 further comprising a right rear wheel load sensor;
a left rear wheel load sensor; and
an alarm activated by the right and left rear load sensor.

17. The wheelbarrow conversion kit of claim 12 wherein the right side lever and wheel assembly, the left side lever and wheel assembly, the right hand pivot bracket, the left hand pivot bracket, and the crossmember shaft are configured
to permit the right side lever to pivot relative to the right hand pivot bracket, so that as the right side handle is raised, the right rear wheel is lowered below a bottom portion of the right rear support, and as the right side handle is lowered, the right rear wheel is raised above the bottom portion of the right rear support, and
to permit the left side lever to pivot relative to the left hand pivot bracket, so that as the left side handle is raised, the left rear wheel is lowered below a bottom portion of the left rear support, and as the left side handle is lowered, the left rear wheel is raised above the bottom portion of the left rear support.

18. The wheelbarrow conversion kit of claim 12 wherein the right side lever and wheel assembly, the left side lever and wheel assembly, the right hand pivot bracket, the left hand pivot bracket, and the crossmember shaft are configured to permit the converted wheelbarrow to be operated in a first single plank mode where an operator lifts the rear two wheels off the ground to obtain normal wheelbarrow maneuverability, or to be operated in a rear wheel mode where an operator lowers the right and left wheels to reduce lifting effort and to improve lateral stability.

19. The wheelbarrow conversion kit of claim 18 wherein the right side lever and wheel assembly, the left side lever and wheel assembly, the right hand pivot bracket, the left hand pivot bracket, and the crossmember shaft are configured to permit the operator to independently select desired heights of the right lever handle and the left lever handle.

20. The wheelbarrow conversion kit of claim 18 wherein the right side lever and wheel assembly, the left side lever and wheel assembly, the right hand pivot bracket, the left hand pivot bracket, and the crossmember shaft are configured to require the right lever handle and the left lever handle to be adjustable to a common height.

21. The wheelbarrow conversion kit of claim 12 wherein the right side lever and wheel assembly, the left side lever and wheel assembly, the right hand pivot bracket, the left hand pivot bracket, and the crossmember shaft are configured
   to permit the right side lever to pivot in a cam action relative to the right hand pivot bracket right lever stop cam, and
   to permit the left side lever to pivot in a cam action relative to the left hand pivot bracket left lever stop cam.

* * * * *